United States Patent

Salis

[11] Patent Number: 6,105,530
[45] Date of Patent: Aug. 22, 2000

[54] FLOATING WHARF OR PIER FOR SHIP MOORING

[76] Inventor: Giorgio Salis, Via S. Satta, 72, 09128 Cagliari, Italy

[21] Appl. No.: 09/217,844

[22] Filed: Dec. 22, 1998

[51] Int. Cl.[7] .................................................. B63B 35/44
[52] U.S. Cl. ........................................... 114/263; 114/264
[58] Field of Search .................................. 114/258, 263; 405/218, 219, 220

[56] References Cited

U.S. PATENT DOCUMENTS

| 3,977,344 | 8/1976 | Holford | 114/263 |
| 5,823,715 | 10/1998 | Murdoch et al. | 114/263 |

FOREIGN PATENT DOCUMENTS

| 0 558 363 | 9/1993 | European Pat. Off. . |
| 2 378 134 | 8/1978 | France . |
| WO83/02126 | 6/1983 | WIPO . |

OTHER PUBLICATIONS

"Prestresed concrete floating pier", T.Y. Lin, Navy Technical Disclosure Bulletin, vol. 9., No. 3, Mar. 1984, pp. 31–37.

*Primary Examiner*—Jesus D. Sotelo
*Attorney, Agent, or Firm*—Sughrue, Mion, Zinn, Macpeak & Seas, PLLC

[57] ABSTRACT

Floating wharf or pier for boat or ship mooring, comprising a body having a cell-like hollow structure defining floatation chambers whose volume is accessible from outside and defines corresponding storage compartments. Admittance into each storage compartment is provided by a respective upper hatch and an inner ladder.

8 Claims, 1 Drawing Sheet

FLOATING WHARF OR PIER FOR SHIP MOORING

BACKGROUND OF THE INVENTION

The present invention is related to floating wharfs or piers for boat and ship mooring, of the type comprising a body having a hollow structure defining at least one floatation chamber.

SUMMARY OF THE INVENTION

The object of the present invention is to provide a floating wharf or pier of the above-referenced type, designed so as to carry out a novel, unique and useful function in connection with exploitation of the space occupied by the wharf itself within the environment of marinas or commercial harbours.

According to the invention, this object is achieved primarily by virtue of the fact that said at least one floatation chamber is accessible from outside and defines a storage compartment. This compartment advantageoulsy enables providing from the or each boat moored at the floating wharf or pier according to the invention a more or less large volume adapted for several utilities, such as for instance storing pieces of equipment, riggings or the like while the boat is either docking or navigating.

According to a preferred embodiment of the invention the body has a cell-like construction with longitudinal and transverse structural bulkheads delimiting a number of said storage compartments, each of which is conveniently accessible from outside through an upper admittance hatch. Moreover each storage compartment is to advantage provided with an inner ladder in correspondance of the respective admittance hatch.

The cell-like body of the floating wharf or pier according to the invention is preferably manufactured according to naval engineering techniques, and may be made of any suitable material (metal, plastic materials, composite materials, concrete-iron, etc).

BRIEF DESCRIPTION OF THE DRAWINGS

The invention will now be disclosed in detail with reference to the accompanying drawings, purely provided by way of non limiting example, in which.

DETAILED DESCRIPTION OF THE INVENTION

Figure 1:
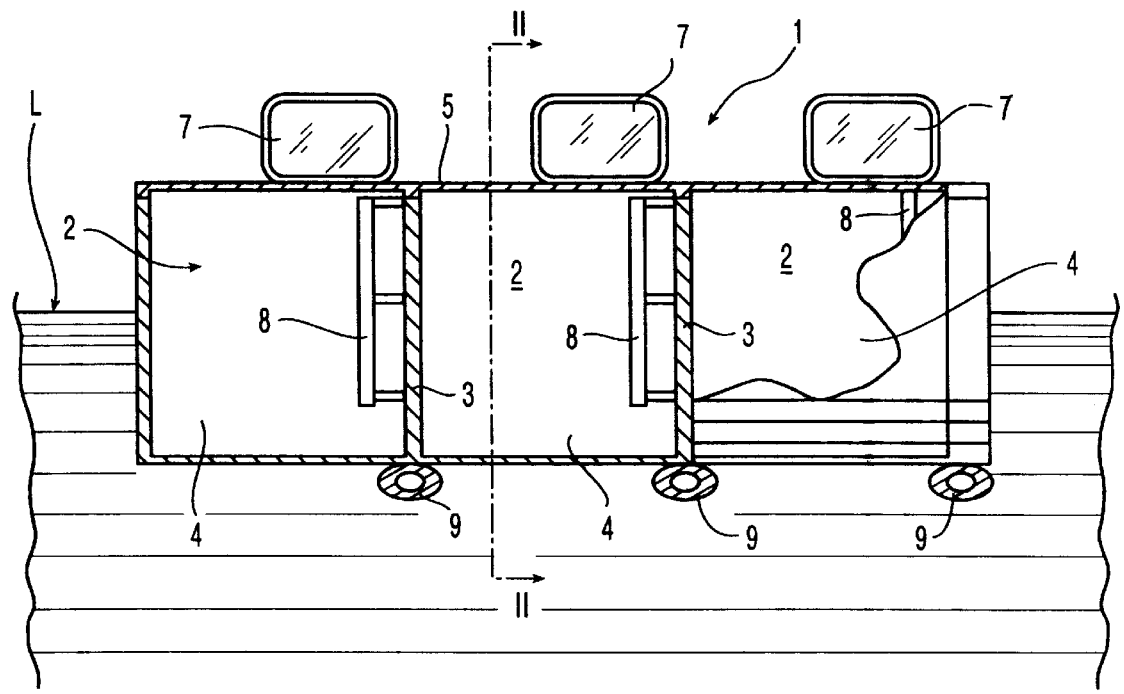
FIG. 1 is a longitudinally sectioned, diagrammatic and partial view showing an embodiment of the floating wharf or pier according to the invention.
Figure 2:
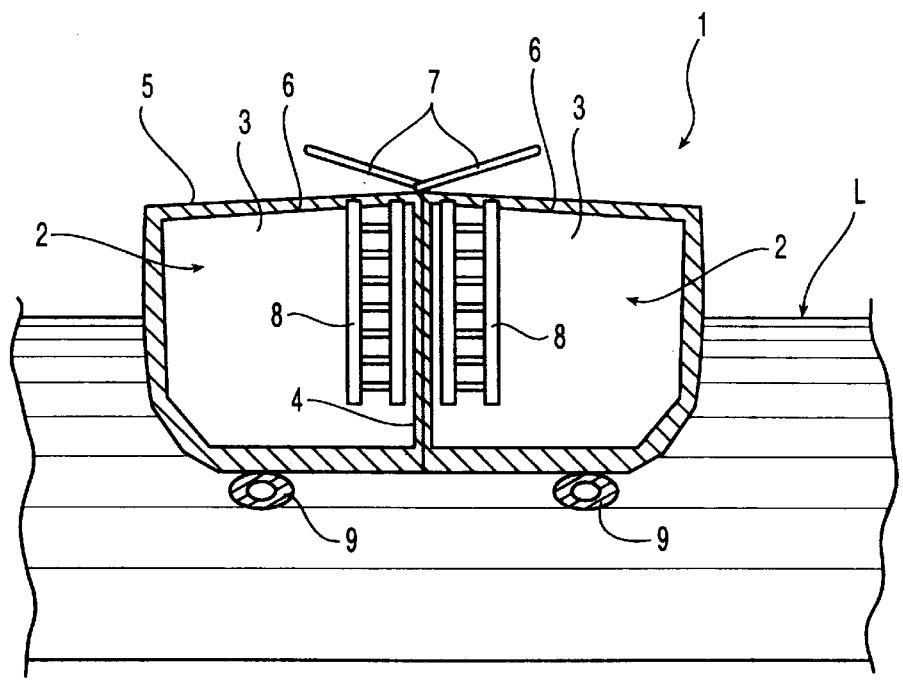
FIG. 2 is a transverse section along line II—II of FIG. 1.

Referring to the drawings, reference numeral 1 generally designates a floating wharf or pier according to the invention intended to be employed for ship or boat mooring within marinas or commercial harbours.

The example shown in drawings actually depicts a modular element adapted to be composed with same modular elements so as to make up a floating wharf or pier having a desired length. Naturally the general arrangement and size of the shown modular element may be widely varied as a function of the installation and use needs.

The floating wharf or pier modular element 1 is formed by a body having a hollow structure, preferably manufactured according to naval construction techniques and made of any suitable material, for instance metal, plastic material, composite material, concrete-iron etc. The body 1 has a cell-like configuration with transverse and longitudinal structural bulkheads 3,4, respectively, delimiting a plurality of floatation chambers 2 by means of which the body 1, when placed in use in the water, substantially stands such as depicted with respect to the waterline designated as L.

According to the fundamental feature of the invention, the floatation chambers 2 are accessible from outside and make corresponding storage compartments available. These storage compartments 2 are thus incorporated within the volume of the floating wharf or pier 1 and can be employed for the most different uses, such as for instance temporary depositing of riggings, appliances, equipment, etc by the users of the boats moored thereto.

To such effect, to each storage compartment 2 a respective upper admittance hatch or door 7 is associated, which may be for instance swinging and possibly provided with a lock closure not shown, so as to provide access through a corresponding aperture 6 formed on the upper wall 5 of the floating wharf or pier body 1.

Moreover each storage compartment 2 is provided, in correspondence of the respective admittance opening 6, with an inner ladder 8.

The floating wharf or pier body 1 is provided inferiorly, in a generally conventional way, with eyebolts or rings 9 for anchoring thereof to dead weights placed at the bottom of the marina or harbour.

Naturally the details of construction and the embodiments may be widely varied with respect to what has been disclosed and illustrated, without thereby departing from the scope of the present invention such as defined in the appended claims.

What is claimed is:

1. A floating wharf or pier for boat for ship mooring, comprising a body having a hollow structure defining at least one floatation chamber, said at least one floatation chamber being accessible from outside and defining a storage compartment and an upper admittance hatch member through which said at least one storage compartment is accessible.

2. Floating wharf or pier according to claim 1, wherein said at least one storage compartment is provided with an inner ladder in correspondence of said admittance hatch.

3. Floating wharf or pier according to claim 2, wherein said body has a cell-like configuration with transverse and longitudinal structural bulkheads delimiting a plurality of said storage compartments.

4. Floating wharf or pier according to claim 3 wherein said body is made of metal.

5. Floating wharf or pier according to claim 3, wherein said body is made of plastic material.

6. Floating wharf or pier according to claim 3, wherein said body is made of composite material.

7. Floating wharf or pier according to claim 3, wherein said body is made of concrete-iron.

8. Floating wharf or pier according to claim 3, wherein said body is provided inferiorly with anchoring members adapted to be connected with dead weights.

\* \* \* \* \*